United States Patent
Köllensperger

(10) Patent No.: US 11,823,852 B2
(45) Date of Patent: Nov. 21, 2023

(54) DC VOLTAGE SWITCH

(71) Applicant: Siemens Aktiengesellschaft, Munich (DE)

(72) Inventor: Peter Köllensperger, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 17/427,491

(22) PCT Filed: Dec. 17, 2019

(86) PCT No.: PCT/EP2019/085674
§ 371 (c)(1),
(2) Date: Jul. 30, 2021

(87) PCT Pub. No.: WO2020/156735
PCT Pub. Date: Aug. 6, 2020

(65) Prior Publication Data
US 2022/0130628 A1  Apr. 28, 2022

(30) Foreign Application Priority Data

Jan. 31, 2019 (EP) ..................................... 19154823

(51) Int. Cl.
*H01H 33/59* (2006.01)
*H02J 1/10* (2006.01)
(Continued)

(52) U.S. Cl.
CPC .......... *H01H 33/596* (2013.01); *H02H 3/243* (2013.01); *H02J 1/102* (2013.01); *H02H 7/268* (2013.01)

(58) Field of Classification Search
CPC ...... H02H 3/243; H02H 7/268; H01H 33/596; H02J 1/06
See application file for complete search history.

(56) References Cited

U.S. PATENT DOCUMENTS

2013/0002209 A1   1/2013  Voegele
2013/0314829 A1*  11/2013 Nakai ..................... H02H 3/20
                                                              361/86
(Continued)

FOREIGN PATENT DOCUMENTS

CN   106160237 A  * 11/2016
CN   108599120 A  *  9/2018  ............... H02H 3/06
(Continued)

OTHER PUBLICATIONS

PCT International Search Report and Written Opinion of International Searching Authority dated Feb. 21, 2020 corresponding to PCT International Application No. PCT/EP2019/085674 filed Dec. 17, 2019.

*Primary Examiner* — Harry R Behm
(74) *Attorney, Agent, or Firm* — Henry M. Feiereisen LLC

(57) ABSTRACT

A DC voltage switch includes a first switch arranged at a first potential between a first terminal of the first switch and a second terminal of the first switch, a first discharging device which is arranged between the first terminal at the first potential and a third terminal at a second potential and includes a first switching element designed as a thyristor, and a second discharging device which is arranged between the second terminal and a fourth terminal at the second potential and includes a second switching element designed as a semiconductor switch that can be switched off. The respective discharging devices connect the first terminal and the third terminal and/or the second terminal and the fourth terminal, at least temporarily, when the DC voltage switch is being or has been switched off.

11 Claims, 3 Drawing Sheets

(51) Int. Cl.
*H02H 3/24* (2006.01)
*H02H 7/26* (2006.01)

(56) References Cited

U.S. PATENT DOCUMENTS

| | | | |
|---|---|---|---|
| 2015/0116875 A1 | 4/2015 | Biurrun Sotelo | |
| 2015/0171617 A1* | 6/2015 | Gaxiola | H02H 3/08 |
| | | | 361/100 |
| 2016/0065209 A1* | 3/2016 | Shen | H03K 17/725 |
| | | | 327/453 |
| 2016/0082907 A1* | 3/2016 | Dong | B60R 16/03 |
| | | | 307/9.1 |
| 2016/0105092 A1 | 4/2016 | Takakura et al. | |
| 2018/0043779 A1 | 2/2018 | Tajima | |
| 2018/0241202 A1* | 8/2018 | Mokhberdoran | H02H 9/02 |

FOREIGN PATENT DOCUMENTS

| | | | |
|---|---|---|---|
| CN | 108683158 A * | 10/2018 | H02H 7/268 |
| DE | 10 2009 055 053 A1 | 6/2011 | |
| DE | 10 2012 204 862 A1 | 10/2013 | |
| DE | 11 2014 002 281 T5 | 1/2016 | |
| DE | 10 2017 113 417 A1 | 2/2018 | |

* cited by examiner

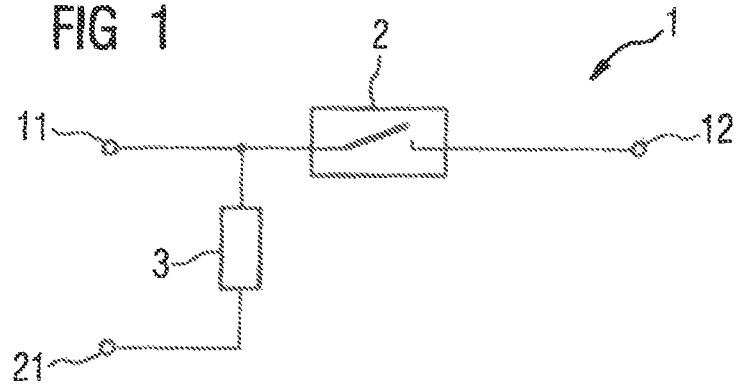
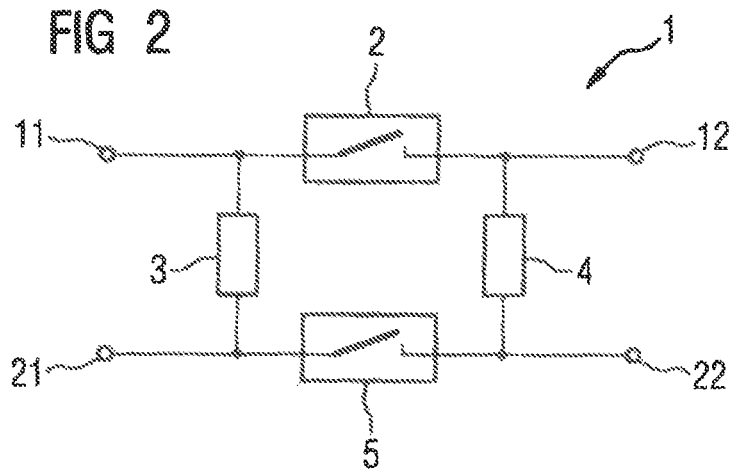
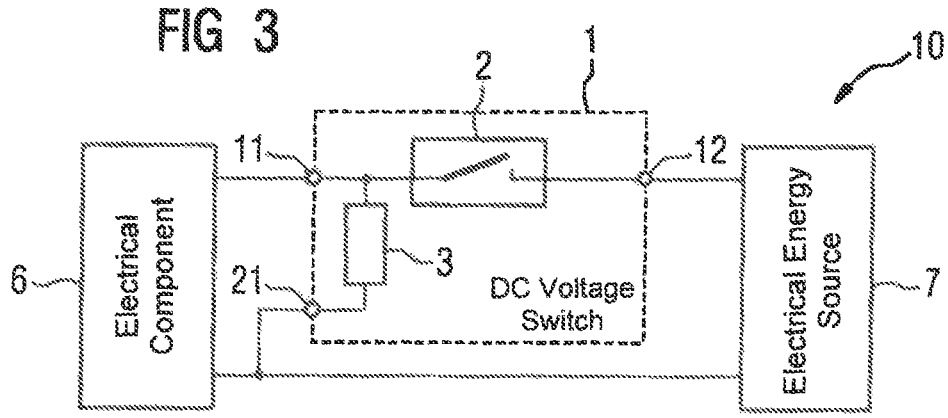

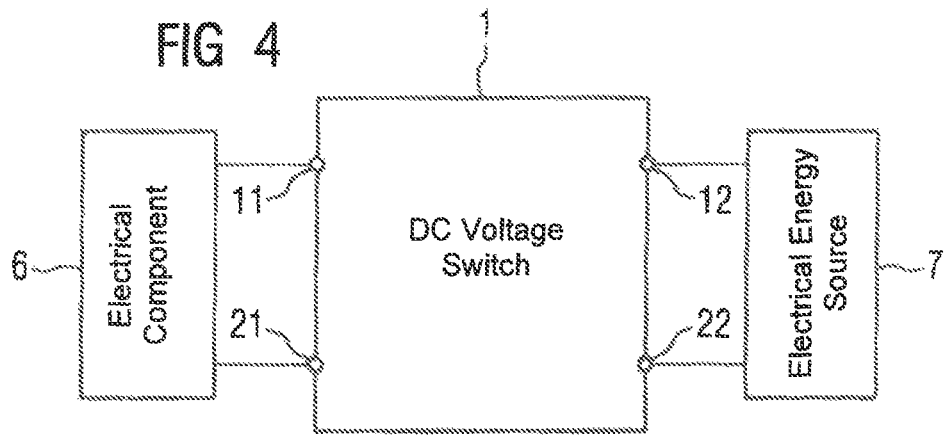
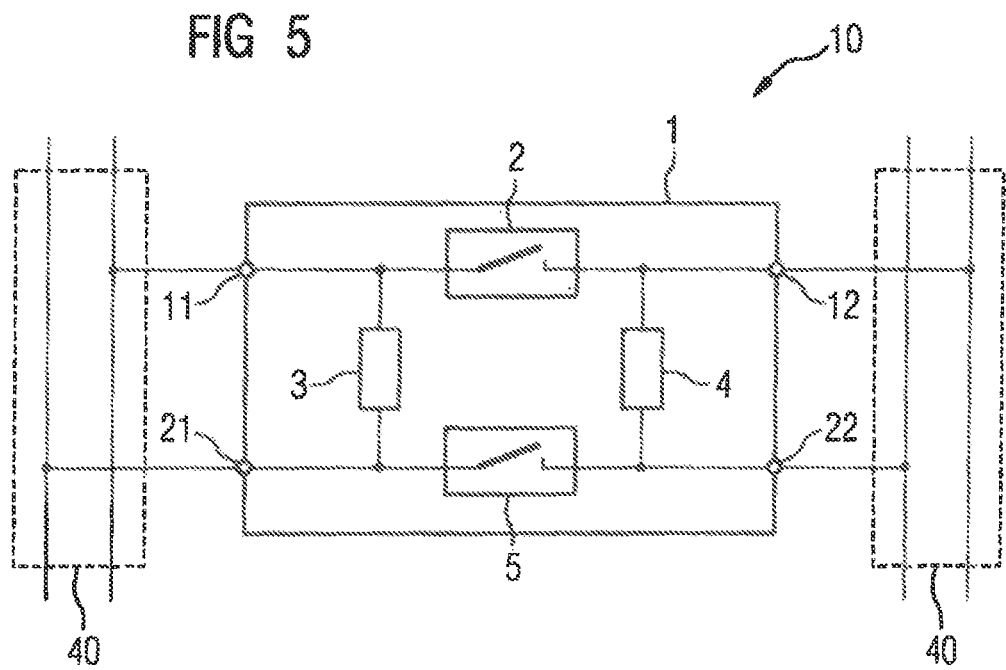

DC VOLTAGE SWITCH

CROSS-REFERENCES TO RELATED APPLICATIONS

This application is the U.S. National Stage of International Application No, PCT/EP2019/085674, filed Dec. 17, 2019, which designated the United States and has been published as International Publication No. WO 2020/156735 A1 and which claims the priority of European Patent Application, Serial No. 19154823.9, filed Jan. 31, 2019, pursuant to 35 U.S.C. 119(a)-(d).

BACKGROUND OF THE INVENTION

The invention relates to a DC voltage switch having a first connection of a first potential and a second connection of the first potential, a switch being arranged between the first connection of the first potential and the second connection of the first potential. The invention further relates to a DC voltage network having such a DC voltage switch. The invention also relates to a method for operating such a DC voltage switch or such a DC voltage network.

A DC voltage switch is used to switch currents which are preferably driven by a DC voltage. Since these are direct currents, this switch is also referred to as a direct current switch, in particular when this switch is only connected to one phase and has only two connections.

Since not only a potential of a conductor but in each case a voltage, for example, the voltage of a DC voltage network, is connected to the connections of the present DC voltage switch, the term DC voltage switch has also been established for this type of switch. A voltage is applied to each of the first connections and the second connections of the DC voltage switch, said voltage resulting as a difference between the first and the second potential. When the switch is closed, the voltage between the first connections is equal to the voltage between the second connections. When the switch is open, the voltages can differ.

Typical components in AC voltage networks, also referred to as AC networks, are transformers, converters with diode feed, motors, and other ohmic-inductive loads. If these are disconnected from the power supply network via a switch, no voltage usually remains on the line and this state is stable.

In DC voltage networks, also referred to as DC networks, the connected loads are either capacitive, ohmic-capacitive, or ohmic-inductive. After switching off components of the network by means of a DC voltage switch, electrical energies stored in the capacitors and/or inductances can again build up a voltage in the DC voltage network on the basis of residual charges or recharging processes. Although this does not necessarily reach the nominal voltage, it can certainly reach a significant level. This can lead to unwanted effects in the network, which is actually switched off, and it can also pose a risk when preparing work on the network.

As a result of the use of voltage intermediate circuit converters and DC/DC converters, which in each case have intermediate circuit capacitors, this problem of the voltage present or building up in the disconnected DC voltage sub-network occurs more frequently.

The object of the invention is to improve a DC voltage switch.

SUMMARY OF THE INVENTION

This object is achieved by a DC voltage switch, having a first connection of a first potential, a second connection of the first potential and a first connection of a second potential, a switch being arranged between the first connection of the first potential and the second connection of the first potential, a discharging apparatus being arranged between the first connection of the first potential and the first connection of the second potential, the discharging apparatus having a switching element, the switching element being designed as a semiconductor switch, in particular as a semiconductor switch which can be switched off or a thyristor. This object is also achieved by a DC voltage network having such a DC voltage switch, wherein the DC voltage network has an electrical component, wherein the electrical component is connected to the first connection and the second connection of the first potential of the DC voltage switch. This object is also achieved by a method for operating such a DC voltage switch or such a DC voltage network, wherein the discharging apparatus connects the first connection of the first potential and the first connection of the second potential to one another, at least temporarily, when the DC voltage switch is or has been switched off.

Further advantageous embodiments of the invention are specified in the dependent claims.

The term connection for a potential means that the corresponding connection is set up to be connected to a specific potential, that is to say to a first or second electrical potential. The difference between the first and the second potential represents an electrical voltage, for example, the voltage at a consumer or a source. In a DC voltage or a single-phase AC voltage, these are two potentials. A three-phase voltage has at least three potentials, Hereinafter, however, only the application for a DC voltage is considered. When the switch is closed, the corresponding potential at the first and second connection is the same, when the switch is open, the first potentials at the first and second connection may differ. In this case, a voltage across the DC voltage switch is present. Hereinafter, the connections for simple differentiation are referred to as the first/second connection of the first/second potential, meaning that it is a connection which is set up for connection to the corresponding potential.

The invention is based on the knowledge that a DC voltage switch can be improved by having a discharging apparatus. In this case, the DC voltage switch can electrically connect the first connection and the second connection of the first potential to one another, then it is in the closed or conductive state, or the DC voltage switch can electrically isolate the first connection and the second connection of the first potential from one another, then it is in the open or non-conductive state. As voltages due to stored energies can also be formed in a DC voltage network or DC voltage sub-network which is electrically isolated from an energy source, in particular from a voltage source, it has proven advantageous to connect these potentials of the DC voltage network to one another by means of the discharging apparatus and thus de-energize it. By connecting the first connection of the first potential and the first connection of the second potential, a voltage between the first and the second potential is reduced with the aid of compensating currents and brought to zero immediately or after the compensating currents have decayed. The components connected to the first connections of the DC voltage switch are thus de-energized and thus in a safe state.

The connection of the different potentials of the discharging apparatus can also be referred to as short-circuiting. A soft short-circuiting is distinguished, which is formed with high resistance using a resistor and can limit compensating currents with the resistor. On the other hand, hard short-circuiting takes place in that the switch connects the potentials directly to one another with low resistance. The effective resistance is then obtained from the resistance of the switch and the corresponding lines.

It has proven advantageous to connect an electrical consumer to the first connections as a load, in which a residual voltage cannot be ruled out on the basis of stored energies. The direction of energy flow is then advantageously obtained, if there is no feedback by means of the load, from the second connections of the DC voltage switch to the first connections.

In the event that electrical components are also arranged at the first connections of the DC voltage switch, which components are able to generate a voltage, such as batteries, for example, it should be possible to switch off the discharging apparatus so that even before the DC voltage switch is switched on, the disconnected side of the DC voltage switch, in this case at the first connections, can already accept a voltage. Otherwise, overloading of the discharging apparatus could occur.

In this case, the discharging apparatus has a semiconductor switch, in particular a semiconductor switch which can be switched off, such as an IGBT or a thyristor, for example. In this case, the thyristor is an embodiment of a semiconductor switch. The mechanical switch, which can also be used instead of a semiconductor switch and is designed, for example, as a mechanical relay, is a simple and cost-effective element for implementing a switch. A semiconductor switch has the advantage of very short switching times. Particularly for DC voltage networks, the semiconductor switch is characterized by the fact that no arcing occurs and therefore even large direct currents can be switched safely and without wear. In this case, for example, an IGBT is suitable as a semiconductor switch, in particular as a semiconductor switch which can be switched off, in particular when the discharge process is to be designed to be interruptible. It is likewise possible to operate this semiconductor in linear operation on the basis of the control connection, for example, of an IGBT. In this case, it can absorb energy from the connected network or from a connected consumer and convert it into heat. In other words, it can assume or support the function of a resistor.

Furthermore, it is also possible to operate the semiconductor switch in a pulse-width-modulated manner if it is designed as a semiconductor switch which can be switched off. The discharge currents can thus be controlled, in particular reduced to certain values such as, for example, maximum permissible current values of, for example, consumers, generators, cabling, safety elements such as fuses, etc. At the same time, it is thus possible to influence the discharge duration. In other words, the discharge duration for discharging can then be influenced and can be predetermined.

Since in many cases it is to be assumed that a current through the discharging apparatus is already at zero after a short time, a thyristor can also be used as a switching element of the discharging apparatus or the further discharging apparatus without any major disadvantage as no current has to be switched off. Thyristors have the advantage that they can be overloaded for a short time so well that they can conduct the short-circuit current without limitation through a resistor without being damaged. A thyristor is therefore particularly suitable for use in the discharging apparatus. The thyristor is a semiconductor switch which cannot be switched off by means of activation but switches off when the current flowing through it becomes zero. Thus, it is referred to as a semiconductor switch which cannot be switched off.

In an advantageous embodiment of the invention, the DC voltage switch has a second connection of the second potential, wherein a further discharging apparatus is arranged between the second connection of the first potential and the second connection of the second potential. Due to the further discharging apparatus, the DC voltage switch has the option of reliably avoiding a voltage in the disconnected state on both sides. The switch is thus also constructed symmetrically with respect to its first and second connections, so that a faulty connection is excluded.

For the connection of two DC voltage sub-networks by the DC voltage switch, it is advantageous that the DC voltage switch has a discharging apparatus or a further discharging apparatus both at the first connections and at the second connections. As both DC voltage sub-networks can be brought into the de-energized state, it is advantageous that the DC voltage switch has a discharging apparatus or further discharging apparatus on both sides. In this way, the disconnected sub-network can be specifically discharged by the discharging apparatus or by the further discharging apparatus. Even in the event that both connected DC voltage sub-networks are switched off, the DC voltage switch enables residual voltages in both DC voltage sub-networks to be eliminated with the aid of the discharging apparatus and the further discharging apparatus.

The discharging apparatus and the further discharging apparatus can be identical in construction. They have the same switching element, for example. The same resistor, if provided, is also possible. Alternatively, it is possible for the discharging apparatus and the further discharging apparatus to differ. In this case, for example, a switching element and/or the resistor can be dimensioned for the currents that arise in order to eliminate residual voltages. In general, this results in different dimensions and thus different components for the two sides, i.e. the first connections on one side and the second connections on the other side, of the switch.

In a further advantageous embodiment of the invention, a further switch is arranged between the first connection of the second potential and the second connection of the second potential. In this embodiment, the two potentials can be separated from one another between the first connections and the second connections. This means that the consumer side is not only disconnected from the voltage on the supply side, but moreover also electrically isolated or, depending on the circuit arrangement, potential-free. This reduces the risk, for example due to a ground fault, that the disconnected side of the DC voltage switch is still subjected to a dangerous voltage. The further switch enables the DC voltage switch to switch off both potentials in a DC voltage network, so that this embodiment is particularly suitable for use in a DC voltage network and provides good protection for the DC voltage network if a ground fault occurs.

In a further advantageous embodiment of the invention, the switch and the further switch are linked to one another. In this case, the switch and the further switch experience the same control and switch synchronously. A two-pole or multi-pole switch is thereby implemented in a simple manner.

In a further advantageous embodiment of the invention, the discharging apparatus and/or the further discharging apparatus is designed to connect the connected connections to the ground potential. In order to also produce contact safety and to be able to carry out work on a disconnected part of the DC voltage network or a DC voltage sub-network, it is advantageous if the discharging apparatus and/or the discharging apparatus not only establish the absence of voltage with electrical isolation, but also securely connect the conductors of the disconnected part of the DC voltage network securely to ground potential. As a result, the grounding can be carried out in a safe manner, which is absolutely essential for work on the disconnected network for safety reasons.

In a further advantageous embodiment of the invention, the state of the discharging apparatus and/or the further discharging apparatus can be displayed. As a result, it is possible for an operator or for maintenance personnel to easily identify whether there is a risk and what risk is posed by a residual voltage or by the possible existence of a potential.

In a further advantageous embodiment of the invention, a resistor, in particular a thermistor, is arranged electrically in series with the switching element. A thermistor is a resistor with a negative temperature coefficient. As a result of the resistor, the discharge currents which result in order to bring the residual voltage to zero can be reduced. A thermistor has proved particularly advantageous for this application as rapid heating by the high compensating currents does not have a negative effect on the resistor value and would lead to a reduction in current. The discharge currents are produced, inter glia, from energy stores which are located in the energy supply network, a part of the energy supply network or in the consumer. Typical energy stores are capacitors, inductances, batteries, or rotating applications.

The use of a resistor increases the discharge duration of this residual voltage but protects the switching element of the discharging apparatus or the further discharging apparatus. The resistor can be arranged inside the housing of the DC voltage switch so that the latter becomes a compact unit, or outside the housing. As a result of the combination of switching element and resistor, the discharging apparatus can also be used as a brake chopper which, for example, converts non-returnable energy from an electrical consumer into heat. The switching element is advantageously dimensioned to be more powerful, and the resistor is arranged outside the housing of the DC voltage switch to enable the simple transfer of heat from the resistor to the environment.

Furthermore, it is possible to monitor the temperature of the resistor and/or the switching element. This can be done on the basis of a temperature measurement or a calculated temperature value, for example, from a temperature model. As soon as a predefinable limit value is exceeded, the discharge switch is switched off and the resistor and/or the discharge switch can cool down after switching off. Furthermore, it is possible, but not necessary, to switch on the discharging apparatus again and continue discharging after falling below a further predefinable limit value. Although discharging takes longer with this monitoring, the discharging apparatus is protected from overloading and associated damage.

In a further advantageous embodiment of the invention, when the voltage increases between the first connection of the first potential and the first connection of the second potential or between the second connection of the first potential and the second connection of the second potential, the switching elements of the discharging apparatus and the further discharging apparatus are closed, and the switch closed. If the voltage at the first or second connection of the first potential and the first or second connection of the second potential cannot be reduced by the activation, i.e. switching on, of the discharge circuit or the further discharge circuit, it can be assumed that there is a fault in the DC voltage switch or the DC voltage network, which fault can no longer be controlled by the DC voltage switch alone. If, in this case, the switch is closed and the discharge circuit as well as the discharge circuit are active, i.e. the switching elements located therein are conductive, in other words closed, the greatest possible discharge current is generated. This can be advantageously dimensioned in such a way that, as a result of this high current, a further safety element, for example a fuse, responds in the DC voltage network and creates a safe state in the DC voltage network. In other words, by closing the switch and the switching elements, a high current flow is achieved in the DC voltage network, which leads to a safety cut-off and thus establishes a safe state in the DC voltage network.

In a further advantageous embodiment of the invention, the connection takes place when the DC voltage switch is switched off and a voltage between the first connection of the first potential and the first connection of the second potential and/or a voltage between the second connection of the first potential and the second connection of the second potential exceeds or falls below a specifiable value. Connecting means connecting to one another. On the one hand, it has proven useful to reduce or eliminate this voltage by means of the discharging apparatus when the voltage applied to the disconnected part of the DC voltage switch is too high. This avoids dangerous contact voltages for humans and inadmissibly high voltages for connected electrical components. As correspondingly high discharge currents during short-circuiting pass through the discharging apparatus at the level of the voltage, a resistor is suitable for preventing excessive discharge currents, said resistor being arranged in series with the switching element of the discharging apparatus and, depending on the dimensioning, being able to limit the discharge current.

It can also be useful to only let the discharging apparatus act when the voltage falls below a predefinable value as it can then be assumed that the discharge currents produced are sufficiently small. This is the case, in particular, if the discharging apparatus or the further discharging apparatus has no resistor or only one resistor with low impedance for current limitation. Without a resistor, the power loss in the discharging apparatus can be kept particularly low, so that the switch can be operated with little loss. However, here too, the energy from the energy stores must also be converted into heat. This then takes place outside the discharging apparatus for example by means of line resistors. As these line resistors are relatively low, discharging takes place with relatively large currents, which mean a corresponding load on the switching element. In order to keep the losses in the electronic switch and in particular in the discharging apparatus low, a corresponding resistor can also be arranged outside the electronic switch.

In a further advantageous embodiment of the invention, the connection of the first connection of the first potential and the first connection of the second potential is interrupted when a voltage between the first connection of the first potential and the first connection of the second potential increases. Increasing the voltage between the potentials may indicate that the discharging apparatus is not or cannot become effective. One possible reason for this is that an electrical energy source is active that prevents discharge. In order to prevent overloading of the discharging apparatus by such an energy source, the discharging apparatus should be isolated from the connections in such a case. This case can be recognized by the fact that, despite an effective discharging apparatus, the voltage at the connections increases or remains constant over a predefinable period of time. Likewise, this monitoring of the increasing voltage can be detected if a disconnected sub-network is made operational again or is operational and is to be switched on again by means of the electronic switch. The connection can thus be carried out in a largely automated manner as the discharge circuit has a corresponding self-disconnection function.

The discharging apparatus is switched off if, for example, the voltage at the connections of the electronic switch increases as a result of an external measure. This may be the case, for example, when a battery is switched on in the sub-network. The discharging apparatus is switched off by switching off the switching element present. As a result, intentional charging of the sub-network is not hindered and at the same time overloading of the discharging apparatus is reliably avoided.

BRIEF DESCRIPTION OF THE DRAWING

The invention is described and explained in more detail hereinafter with reference to the exemplary embodiments shown in the figures, in which:

FIG. 1 and FIG. 2 show a DC voltage switch,
FIG. 3 to FIG. 5 show a DC voltage network.

DETAILED DESCRIPTION OF PREFERRED EMBODIMENTS

Figure 6:
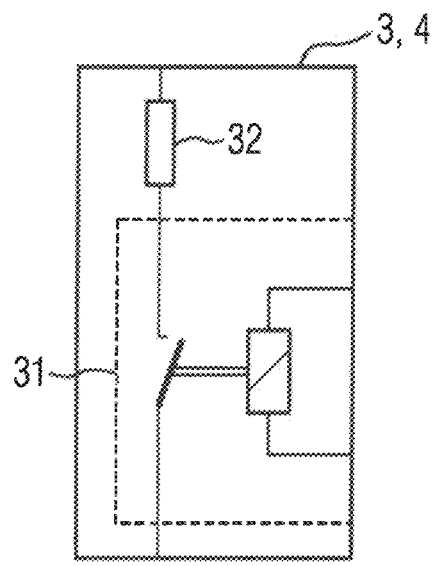
FIG. 6 to FIG. 9 show a discharging apparatus.

FIG. 1 shows a DC voltage switch 1, A switch 2 is arranged between the first connection 11 and the second connection 12 of a first potential. This switch 2 makes it possible to establish or interrupt an electrically conductive connection between the first connection 11 of the first potential and the second connection 12 of the first potential. Furthermore, the DC voltage switch 1 has a first connection 21 of a second potential. A discharging apparatus 3 is arranged between this first connection 21 of the second potential and the first connection 11 of the first potential. The discharging apparatus 3 ensures that after the switch 2 has been opened, the first connection 11 of the first potential and the first connection 21 of the second potential are electrically connected to one another. This eliminates a residual voltage which might arise or be present between the first and second potential. Examples of such a residual voltage are capacitors, such as those found, inter glia, in converters. This exemplary embodiment of the DC voltage switch 1 is particularly suitable for connecting an electrical component 6 as a load at the first connections 11, 21, which electrical component 6 could still have a residual voltage when it is switched off. At the second connection 12 of the first potential, this DC voltage switch 1 is suitable for connection to an electrical energy source 7, not shown here, or to a sub-network 40, likewise not shown here, which has such an energy source 7.

FIG. 2 shows a further exemplary embodiment of a DC voltage switch 1, To avoid repetition, reference is made to the description for FIG. 1 and to the reference characters introduced there. Analogously to the first connections 11, 21 of the first or the second potential, this DC voltage switch 1 also has a second connection 22 of the second potential. Analogously to the first connections 11, 21, which can be short-circuited by means of a discharging apparatus 3, the second connections 12, 22 also have a further discharging apparatus 4 with which these second connections 12, 22 can be short-circuited. As a result, residual voltage on electrical components which are connected to the second connections 12, 22 can also be avoided and/or eliminated. This exemplary embodiment of the DC voltage switch 1 thus offers the advantage of short-circuiting the connected electrical components 6, not shown here, or the connected sub-network 40, not shown here, on both sides of the DC voltage switch 1 directly, that is to say with low impedance, or via a resistor. Furthermore, it is possible to arrange a further switch 5 between the first connection 21 of the second potential and the second connection 22 of the second potential. This further switch 5 makes it possible to separate the first connections 11, 21 and the second connections 12, 22 from one another with both potentials, that is to say multi-pole or two-pole. To prevent a current flow between the first connections 11, 21 and the second connections 12, 22, a single switch 2 would already suffice. The further switch 5 provides the option not only of preventing the current flow, but also of isolating the first connections 11, 21 and the second connections 12, 22 from one another in terms of potential. This is particularly advantageous in order to be able to safely control ground faults in a DC voltage network. Furthermore, the components of the disconnected branch of the DC voltage network can be grounded without problems, provided that no voltage or current sources are active.

FIG. 3 shows a DC voltage network 10 having a DC voltage switch 1 which connects an electrical component 6, in particular an electrical consumer or an electrical load, to an electrical energy source 7. The DC voltage switch 1 is exemplified as shown in FIG. 1. To avoid repetition, reference is made to the description of FIGS. 1 and 2 and to the reference characters introduced there. The first connection 11 of the first potential of the DC voltage switch 1 is connected to the electrical component 6. The second connection 12 of the first potential is connected to the electrical energy source 7. The electrical component 6 and the electrical energy source 7 are directly connected to one another with regard to their second potential. This direct connection is connected to the first connection 21 of the second potential.

FIG. 4 shows a further exemplary embodiment of a DC voltage network 10. The DC voltage switch 1 has four connections 11, 12, 21, 22. A first connection 11, 21 and a second connection 12, 22 are provided for each of the two potentials. The DC voltage switch 1 has at least one switch 2 and one discharging apparatus 3. These can be arranged, for example, as shown in FIG. 1. Furthermore, the DC voltage switch 1 may also have a further discharging apparatus 4 which is designed to be comparable to the circuit of FIG. 2. It is also optionally possible to arrange a further switch 5 in the connection between the first connection 21 of the second potential and the second connection 22 of the second potential in order to enable electrical isolation or freedom from potential between the potentials on both sides of the DC voltage switch 1. Furthermore, reference is made to the description of FIGS. 1 to 3 and to the reference characters introduced there.

FIG. 5 shows a further exemplary embodiment of a DC voltage network 10. The DC voltage network 10 has two DC voltage sub-networks 40 which are separably connected to one another via the DC voltage switch 1. As both DC voltage sub-networks 40 can have electrical components 6, not shown here, which have a residual voltage when switched off, it is advantageous if the DC voltage switch 1 has both a discharging apparatus 3 for the first connections 11, 21, and furthermore a further discharging apparatus 4 for the second connections 12, 22. When the two DC voltage sub-networks 40 are disconnected by opening the DC voltage switch 1, both DC voltage sub-networks 40 can be operated independently of one another. Likewise, it is possible to switch off one or both of the DC voltage sub-networks 40. In this context, switched off means that an electrical energy source is no longer active in this sub-network. A DC voltage sub-network 40 switched off in this way can also be de-energized with the aid of the discharging apparatus 3 or with the aid of the further discharging apparatus 4 and also made potential-free when a further switch 5 is used. By means of the discharging apparatus 3 or the further discharging apparatus 4, residual voltages present are brought to zero by discharge currents. If the DC voltage switch 1, as shown, also has a further switch 5, then the two DC voltage sub-networks 40 can also be isolated from one another in terms of potential, regardless of whether they are switched off or operating in isolation from one another.

FIG. 6 shows an exemplary embodiment of a discharging apparatus 3 or a further discharging apparatus 4. This has a switching element 31 with which the two first connections 11, 21 or the two second connections 12, 22 of the DC voltage switch 1 can be short-circuited. The short-circuiting is short-circuiting which is also referred to as soft short-circuiting, as this takes place with the aid of a resistor with high impedance. In the case of hard short-circuiting, which is also possible, the switching element 31 would short-circuit the connections directly, without a resistor. The discharging apparatus is then without resistance. The exemplary embodiments of FIGS. 6 to 9 can also alternatively also be configured without resistance, in that the resistor 32 is not present or is replaced by a conductive connection.

In this exemplary embodiment, the switching element 31 is realized as a mechanical switch, for example, as a mechanical relay. In order to reduce the discharge currents when the first and second connections are short-circuited, a resistor 32 can be arranged in series with the switching element 31. This resistor 32 reduces the discharge currents and thus the load for the electrical component to be discharged and also the switching element 31. This increases the service life of the DC voltage switch 1.

Figure 7:
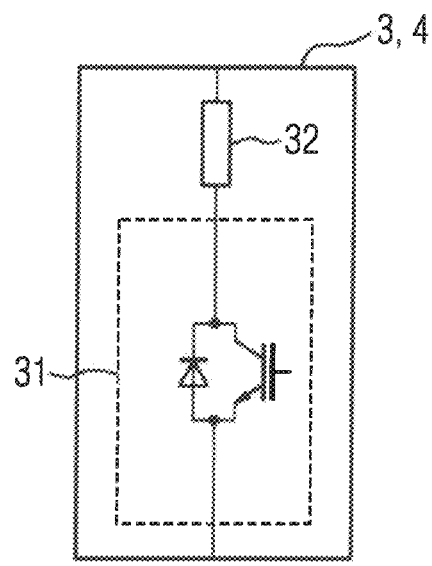
Figure 8:
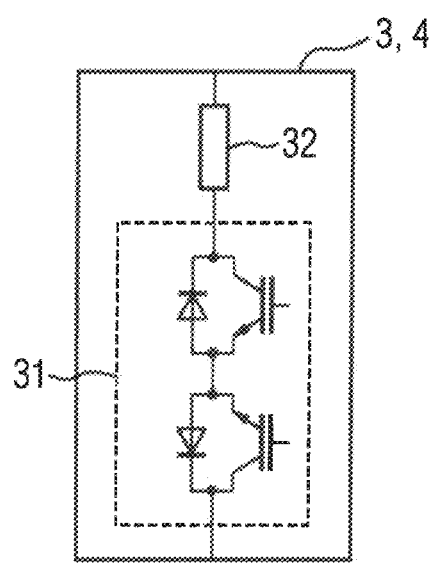

FIG. 7 shows a further exemplary embodiment of a discharging apparatus 3 or a further discharging apparatus 4, wherein the switching element 31 is designed as a semiconductor switch. The switching element 31 is also designed as a semiconductor switch in the exemplary embodiment of FIG. 8. Unlike FIG. 7, the semiconductor switch in FIG. 8 can be used for voltages of different polarity. For this purpose, the two semiconductors are arranged antiserially. The semiconductors are advantageously connected to one another at their emitter connection. In other words, the semiconductors are arranged in a series circuit in which the semiconductors can each switch off a current of different polarity. The collector connection of the first semiconductor then forms a connection of the discharging apparatus. The collector connection of the second semiconductor forms the second connection of the discharging apparatus for a hard short-circuiter or as shown here, the resistor 32 is connected to the collector. Connecting the semiconductors to one another at their emitter connections offers the advantage of being able to use the same control voltage for both semiconductors without having to provide electrical isolation for the individual control voltages. Technically, it is alternatively also possible to connect the semiconductors to one another at their collector connections. IGBT semiconductors, for example, can be used as semiconductors.

Figure 9:
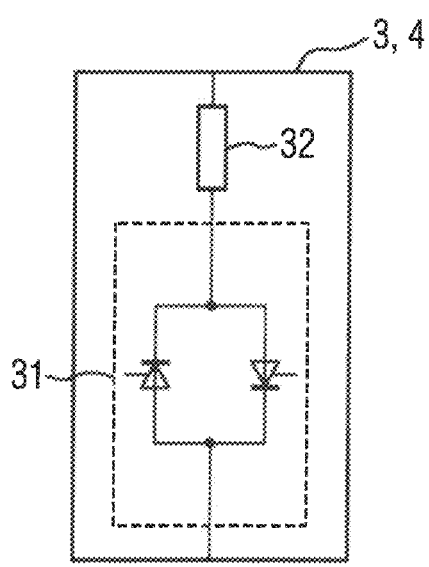

FIG. 9 shows a further exemplary embodiment of a discharging apparatus 3 or a further discharging apparatus 4. In this case, the switching element 31 is formed by thyristors. These are arranged in such a manner that the voltage at the two connections can have different polarities. If there is only one polarity at each of the connections, one of the thyristors arranged in parallel can be dispensed with. Alternatively, other reverse-blocking semiconductors, in particular also semiconductor switches which can be switched off, can also be arranged in such a circuit arrangement.

In summary, the invention relates to a DC voltage switch, having a first connection of a first potential, a second connection of the first potential and a first connection of a second potential, a switch being arranged between the first connection of the first potential and the second connection of the first potential. To improve the DC voltage switch, it is proposed that a discharging apparatus be arranged between the first connection of the first potential and the first connection of the second potential, the discharging apparatus having a switching element, the switching element being designed as a semiconductor switch, more particularly as a semiconductor switch which can be switched off or a thyristor. The invention further relates to a DC voltage network having such a DC voltage switch, wherein the DC voltage network has an electrical component, wherein the electrical component is connected to the first connection and the second connection of the first potential. The invention also relates to a method for operating such a DC voltage switch or such a DC voltage network, wherein the discharging apparatus connects the first connection of the first potential and the first connection of the second potential to one another, at least temporarily, when the DC voltage switch is or has been switched off.

The invention claimed is:

1. A DC voltage switch, comprising:
 a first switch arranged at a first potential between a first terminal of the first switch and a second terminal of the first switch,
 a first discharging device arranged between the first terminal at the first potential and a third terminal at a second potential and comprising a first switching element designed as a thyristor, and
 a second discharging device arranged between the second terminal and a fourth terminal at the second potential and comprising a second switching element designed as a semiconductor switch that can bp switched off,
 wherein the second switching element is configured to control a discharge current in pulse-width-modulated operation and to thereby reduce the discharge current to a permissible current value of a safety element.

2. The DC voltage switch of claim 1, further comprising a second switch arranged between the third terminal and the fourth terminal.

3. The DC voltage switch of claim 2, wherein the first switch and the second switch are coupled to one another so as to switch synchronously.

4. The DC voltage switch of claim 1, wherein the third terminal connected to the first discharging device is connected to ground potential.

5. The DC voltage switch of claim 1, wherein the fourth terminal connected to the second discharging device is connected to ground potential.

6. The DC voltage switch of claim 1, wherein a state of at least one of the first and second discharging device can be displayed.

7. The DC voltage switch of claim 1, further comprising a resistor electrically connected in series with at least one of the first and second switching element.

8. The DC voltage switch of claim 7, wherein the resistor is constructed as a thermistor.

9. A DC voltage network, comprising:
 a DC voltage switch comprising a first switch arranged at a first potential between a first terminal of the first switch and a second terminal of the first switch, a first discharging device arranged between the first terminal at the first potential and a third terminal at a second potential and comprising a first switching element designed as a thyristor, a second discharging device arranged between the second terminal and a fourth terminal at the second potential and comprising a second switching element designed as a semiconductor switch that can be switched off, an electrical component connected to the first connection terminal and the third terminal, and an electrical energy source connected to the second terminal and the fourth terminal, wherein the second switching element is configured to control a discharge current in pulse-width-modulated operation and to thereby reduce the discharge current to a permissible current value of a safety element.

10. A method for operating a DC voltage switch or of a DC voltage network having the DC voltage switch, wherein the DC voltage switch comprises a first switch arranged at a first potential between a first terminal of the first switch and a second terminal of the first switch, and a first discharging device arranged between the first terminal at the first potential and a third terminal at a second potential and comprising a first switching element designed as a thyristor, and a second discharging device arranged between the second terminal and a fourth terminal at the second potential and comprising a second switching element designed as semiconductor switch that can be switched off the method comprising connecting with the first discharging device at least temporarily the first terminal and the third terminal to one another when the DC voltage switch is being or has been switched off, or connecting with the second discharging device at least temporarily the second term and the fourth terminal to one another when the DC voltage switch is being or has been switched off, or connecting both with the first discharging device at least temporarily the first terminal and the third terminal to one another and connecting with the second discharging device at least temporarily, the second terminal and the fourth terminal to one another when the DC voltage switch is being or has been switched off, wherein when a voltage between the first terminal and the third terminal or a voltage between the second terminal and the fourth terminal rises, the first and second switching elements and the first switch are closed.

11. The method of claim 10, wherein the first terminal and the third terminal and/or the second terminal and the fourth terminal are connected, when the DC voltage switch is switched off and a voltage between the first terminal and the third terminal and/or a voltage between the second terminal and the fourth terminal exceeds or falls below a predetermined value.

* * * * *